United States Patent [19]

Li

[11] 4,289,668
[45] Sep. 15, 1981

[54] POLYMER SYSTEMS PLASTICIZED WITH HYDROXY FATTY ACIDS

[75] Inventor: George S. Li, Macedonia, Ohio

[73] Assignee: The Standard Oil Company, Cleveland, Ohio

[21] Appl. No.: 196,885

[22] Filed: Oct. 14, 1980

[51] Int. Cl.³ ............................................. C08L 91/00
[52] U.S. Cl. ............................................. 260/23 AR
[58] Field of Search ..................... 260/31.2 R, 23 AR

[56] References Cited

U.S. PATENT DOCUMENTS 3,719,618  3/1973  Makhlouf .................. 260/23 AR
4,128,185  12/1978  Wszolek .................... 260/23 AR

*Primary Examiner*—Joseph L. Schofer
*Assistant Examiner*—N. F. Sarofim

*Attorney, Agent, or Firm*—William D. Mooney; Herbert D. Knudsen; Larry W. Evans

[57] ABSTRACT

A plasticized resin system is described, and the system comprises an intimate mixture of
 (a) an interpolymer derived from at least one vinyl monomer and an α,β- unsaturated dicarboxylic acid, anhydride or the lower alkyl esters thereof, and
 (b) a plasticizing amount of a hydroxy substituted fatty acid containing at least about eight carbon atoms.

The plasticized resin system also may contain at least one additional polar resin such as polycarbonates, polysulfones, polyesters, etc. The use of the hydroxy substituted fatty acid in this manner improves the processability of the interpolymers.

21 Claims, No Drawings

POLYMER SYSTEMS PLASTICIZED WITH HYDROXY FATTY ACIDS

BACKGROUND OF THE INVENTION

This invention relates to polymer resin systems which have been plasticized with a hydroxy substituted fatty acid containing at least about eight carbon atoms, and more particularly, polymer resins of at least one vinyl monomer and an α,β-unsaturated dicarboxylic acid, anhydride or ester. The invention relates particularly to polymer resin systems based on a styrene and maleic acid or anhydride.

It is known that the flowability and processability of thermoplastic polymers can be improved by the addition thereto of various compositions which have been referred to as processing aids, internal lubricants, and/or plasticizers. The term "plasticizer" will be used in this application and in the claims to embrace processing aids and internal lubricants as well.

A critical requirement of plasticizers is that they must not deteriorate the desired physical properties of the polymer resin systems such as tensile strength, heat-distortion temperature, etc. Thus, compositions which are useful as plasticizers and some thermoplastic compositions will not be useful in other thermoplastic compositions.

Interpolymers of at least one vinyl monomer and an α,β-unsaturated dicarboxylic acids, anhydrides or esters thereof are known in the art. Copolymers of styrene and maleic anhydride acid, or the esters thereof are examples of one type of interpolymer which are plasticized in accordance with this invention and which are described in the art such as in U.S. Pat. Nos. 2,430,313, 2,606,891, 2,640,819, 3,451,979 and 3,732,332.

U.S. Pat. Nos. 4,020,966 and 4,130,213 describe plastisol compositions of copolymer resins of normal alpha-olefins and maleic anhydride. These patents indicate that the plasticizer should be capable of solvating or dissolving the alpha olefin-maleic anhydride copolymer resin when heated, and they must remain essentially completely compatible with the resin upon cooling. Examples of such plasticizers given in these patents include dialkyl phthalates, alkyl phthalyl alkyl glycolates, dialkyl esters of alkane dicarboxylic acids, acetyl trialkyl citrates, and trialkyl and triaryl phosphates. Also disclosed as being useful are alkyl esters of fatty acids such as octyl stearate, epoxidized triglycerides, polyesters, amines, etc. The amount of plasticizer utilized in the resin compositions can range between about 65 to about 600 parts of the plasticizer per 100 parts by weight of the resin component.

Internal lubricants for improving the flow properties of high nitrile copolymers are described in U.S. Pat. No. 4,151,151. The lubricants are described as being polar organic materials which include phthalic anhydride, succinic anhydride, glutaric anhydride, succinimide, phthalimide, saccharin, adipamide, urea, etc.

Processing aids for nitrile resins also is the subject matter of U.S. Pat. No. 4,000,106. The processing aids are alkyl diesters of organic dicarboxylic acids. The preferred dicarboxylic acids include the propyl, butyl, amyl and hexyl phthalates, adipates, azelates, and sebecates. The processing aids are useful in the range of from about 0.05 to 2 parts by weight per 100 parts of the resin of which they are incorporated. An example in this patent indicates that stearic acid and methyl laurate were not acceptable processing aids for the particular resins studied.

SUMMARY OF THE INVENTION

A plasticized resin system is described and comprises
(a) an interpolymer derived from at least one vinyl monomer and an α,β-unsaturated dicarboxylic acid, anhydride or lower alkyl ester thereof, and
(b) a plasticizing amount of a hydroxy substituted fatty acid containing at least about eight carbon atoms.

These plasticized resin systems exhibit improved flowability and processability.

DESCRIPTION OF THE PREFERRED EMBODIMENTS

The interpolymers are copolymers, terpolymers, and other interpolymers of α,β-unsaturated dicarboxlyic acids, anhydrides, the lower alkyl esters thereof, or mixtures of two or more of any of these such as maleic anhydride, and one or more vinyl monomers having up to 12 carbon atoms.

The vinyl monomers contemplated as being useful in the resins of the present invention can be defined more clearly by the following general formula

wherein
A is hydrogen or an alkyl group containing from 1 to about 4 carbon atoms and preferably from about 1 to 2 carbon atoms, and
B is hydrogen or an alkyl, alkenyl, alkoxy, acyl, phenyl, substituted phenyl, nitrile, carboxyl, carboxylic ester or carboxlyic amide group, or
A, B and C' taken together form a cyclic or bicyclic group.

Suitable vinyl monomers of up to about 12 carbon atoms which can be polymerized with the α,β-unsaturated dicarboxylic acids, anhydrides or the lower esters thereof are well known. As used herein, and in the appended claims, the terminology "vinyl monomer" refers to any of these well-known compounds which can be polymerized with the α,β-unsaturated carboxylic acids, anhydrides or the esters thereof to form the interpolymers of this invention. The nature of the vinyl monomer is normally not a critical or essential aspect of this invention as these compounds serve primarily as a connective moiety for the α,β-unsaturated compounds in forming the interpolymers. The vinyl monomers as represented by Formula I include aliphatic and aromatic compounds such as hydrocarbon monoolefins, particularly aliphatic alpha-olefins, e.g., ethylene, propylene, butene, isobutylene, and octene; vinyl ethers, especially lower alkyl vinyl ethers and aryl vinyl ethers such as methyl vinyl ether, propyl vinyl ethers, phenyl vinyl ether, and para-lower alkoxy-phenyl vinyl ethers; vinyl esters, e.g., vinyl acetate, vinyl propionate, isopropenyl acetate and isopropenyl butyrates; vinyl acids, e.g., acrylic acid and methacrylic acid; vinyl amides, e.g., acrylamide and N,N-dimethylacrylamide; allyl esters, e.g., allyl acetate and allyl butyrate; vinyl halides, e.g., vinyl chloride and vinyl bromide; vinyl nitriles, e.g., acrylonitrile and methacrylonitrile, and cyclic and bicyclic compounds such as beta pinene and indene. Mixtures of two or more monoolefinic monomers can be used. Preferred monoolefinic monomers include aliphatic hydrocarbon alpha-olefins, vinyl ethers and vinyl aromatic compounds.

A particularly preferred vinyl monomer compound in the preparation of the polymer resin is a styrene. The term "a styrene" as used herein refers to styrene or any of the various substituted styrenes containing substituents which are inert to the polymerization reaction such as halogen and haloalkyl-substituted styrene, hydrocarbon-substituted styrenes, alkoxy-styrenes, alkyoxy-styrenes, nitro-styrenes, etc. Examples of such substituted styrenes include alpha-methyl styrene, 4-chloro styrene, 4-ethyl styrene, 2-methyl styrene, 2-phenyl styrene, 4-methoxy styrene, 3-nitro styrene, 2,4-dimethyl styrene, isopropyl styrene, 2-methyl-4-chlorostyrene, vinyl naphthalene 2-methyl-4-benzylstyrene, and mixtures thereof. In most instances, however, it is preferred to use styrene itself by reason of its low cost, commercial availability and excellence as a starting material for the preparation of the resin used in this invention.

Suitable $\alpha,\beta$-unsaturated dicarboxylic acids, anhydrides or the lower alkyl esters thereof for the preparation of the inter-polymers include those wherein a carbon-to-carbon double bond is in an $\alpha,\beta$-position to at least one of the carboxy functions (e.g., itaconic acid, anhydride or lower esters thereof) and preferably, in an $\alpha,\beta$-position to both of the carboxy functions of the $\alpha,\beta$-dicarboxylic acid, anhydride or the lower alkyl ester thereof (e.g., maleic acid, anhydride or lower alkyl esters thereof). Normally, the carboxy functions of these compounds will be separated by up to 4 carbon atoms, preferably 2 carbon atoms.

A class of preferred $\alpha,\beta$-unsaturated dicarboxylic acid, anhydrides or the lower alkyl esters thereof, include those compounds corresponding to the formulae:

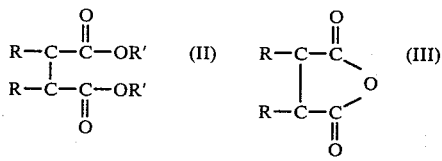

(including the geometric isomers thereof, e.g., cis- and trans-) wherein each R is independently a hydrogen; halogen (e.g., chloro, bromo, or iodo); hydrocarbyl or halogen-substituted hydrocarbyl of up to about 8 carbon atoms, preferably alkyl, alkaryl or aryl; (preferably, at least one R is hydrogen); and each R' is independently hydrogen or lower alkyl of up to about 7 carbon atoms (e.g., methyl, ethyl, butyl or heptyl). These preferred $\alpha,\beta$-unsaturated dicarboxylic acids, anhydrides or the alkyl esters thereof contain a total carbon content of up to about 25 carbon atoms, normally up to about 15 carbon atoms. Typical examples include maleic acid; maleic anhydride; methyl maleic anhydride; propyl maleic anhydride; 1,2-diethyl maleic anhydride; phenyl maleic anhydride; benzyl maleic anhydride; chloro maleic anhydride; heptyl maleate; citaconic anhydride; ethyl fumarate; fumaric acid; mesaconic acid; ethyl isopropyl maleate; isopropyl fumarate; hexyl methyl maleate; phenyl maleic anhydride and the like. These and other $\alpha,\beta$-unsaturated dicarboxylic compounds are well known in the art. Of these $\alpha,\beta$-unsaturated dicarboxylic compounds, maleic anhydride, maleic acid or fumaric acid or the lower alkyl esters thereof are preferred. Interpolymers derived from mixtures of two or more of any of these also can be used.

The interpolymer preferably will comprise from about 40 to 90 molar parts of at least one vinyl monomer and from about 10 to about 60 molar parts of the $\alpha,\beta$-unsaturated dicarboxylic acid, anhydride or ester. Methods for preparing these polymer resins are well known in the art and many, if not most of the polymer resins, comprising vinyl monomers and maleic acid or anhydride which can be plasticized in accordance with the method of this invention are available commercially.

Examples of polymerization reactions of $\alpha,\beta$-unsaturated dicarboxylic acids, anhydrides or the lower alkyl esters thereof with vinyl monomers are found in, e.g., U.S. Pat. Nos. 2,615,845 (maleic anhydride and $\alpha$-olefins); 2,988,539 (maleic anhydride and vinyl compounds); 3,087,893 (maleic anhydride and esters of unsaturated monocarboxylic acids); 3,451,979 (maleic anhydride and styrene). Other examples are well known in the art.

Particularly preferred interpolymers are those of interpolymers made by reacting maleic acid, the anhydride or the lower esters thereof with styrene or methyl syrene. They can be prepared according to methods known in the art, as for example, free radical initiated (e.g., by benzoyl peroxide) solution polymerization. Examples of such suitable interpolymerization techniques are described in U.S. Pat. Nos. 2,938,016; 2,980,653; 3,085,994; 3,342,787; 3,418,292; 3,451,979; 3,558,570; 3,702,300; and 3,723,375. These patents are incorporated herein by reference for their teaching of the preparation of suitable maleic anhydride and styrene containing interpolymers. Other preparative techniques are known in the art.

Interpolymers of the type described above can be plasticized in accordance with the present invention by incorporating therein, a plasticizing amount of a hydroxy substituted fatty acid containing at least about 8 carbon atoms and preferably from about 8 to 22 carbon atoms. The fatty acids which can be utilized include the saturated and the unsaturated fatty acids, although the saturated fatty acids are preferred. Examples of suitable fatty acids include linoleic, linolenic, oleic, palmitic, lauric stearic, ricinoleic and behenic acids. Hydroxy substituted fatty acids are known in the art and may be obtained commercially. The fatty acids useful in this invention contain at least one hydroxy substituent although the mono substituted acids are preferred. Examples of hydroxy substituted fatty acids include 16-hydroxy-palmitic acid, 9, 10, 16-trihydroxy palmitic acid, 2-hydroxy stearic acid, 3-hydroxy stearic acid, 10-hydroxy stearic acid, 11-hydroxy stearic acid, 12-hydroxy stearic acid, 9, 10-dihydroxy stearic acid, 12-hydroxy oleic acid, 12-hydroxy ricinoleic acid, etc. One particularly preferred fatty acid is 12-hydroxy stearic acid.

The amount of hydroxy substituted fatty acid incorporated into the interpolymer is an amount which is sufficient to plasticize the polymer. In general, the plasticized resin system will contain up to about 20 or more parts of the hydroxy substituted fatty acid per 100 parts of resin, the amount being selected for any particular application depending upon, among other things, the particular resin being plasticized.

The hydroxy substituted fatty acids containing at least about 8 carbon atoms can be dispersed in the polymer resins described above in any one of a number of methods which are well known to those skilled in the art. The dispersions can be prepared in an extruder, an internal mixer such as a Banbury or Brabender, and the dispersion also can be made by adding the fatty acid to a polymer resin latex or dispersion or solution. The fatty acid also can be intimately mixed with the interpolymer by adding the fatty acid to a powdered granular resin in a high speed mixer.

The interpolymers which can be plasticized with a hydroxy substituted fatty acid as described above also may contain other resins, and particularly polar type resin compositions. Examples of polar resins which can be mixed with the interpolymers described above include polycarbonates, polysulfones, polyesters, polyamides, polyphenylene oxides, ABS, SAN, or high nitrile polymers. The amount of such polar resins included in the plasticized resin systems of the invention may be as high as 400 parts per 100 parts of the interpolymer. These polar resins may be blended with the interpolymers in order to modify the properties of the final product, and the particular polar resin blended with the interpolymers will depend upon the properties desired in the final product.

Polycarbonates exhibit exceptionally high impact strength, good electrical properties, dimensional stability, rigidity, etc. Polycarbonates are resins in which groups of dihydric or polyhydric phenols are linked through carbonate groups. Polycarbonates can be prepared, for example, by the reaction of aromatic dihydroxy compounds with phosgene or bis-chlorocarbonic acid esters in accordance with known processes of interfacial polycondensation. Polycarbonate base resins are available commercially in the United States from several companies including the General Electric Company (available under the general trade designation Lexan) and Mobay Chemical Company (available under the general trade designation Merlon). The preparation of polycarbonates is described in, e.g., U.S. Pat. Nos. 3,943,094; 3,028,365; 3,280,078 and 3,014,891.

Polysulfones which can be included in the plasticized resin systems of the invention are characterized by high strength, low creep, high resistance to acids, alkali and salt solutions, and good resistance to detergents, oils and alcohols, even at elevated temperatures. Polysulfones are sulfur-containing thermoplastics made by reacting bisphenol A and 4,4'-dichlorodiphenyl sulfone with potassium hydroxide in dimethyl sulfone at 130°–140° C. The structure of the polymer includes benzene rings or phenylene units linked by three different chemical groups, namely, a sulfone group, an ether linkage and an isopropylidine group. Polysulfones are available commercially such as from Union Carbide Corp., ("UDEL" and "RADEL"), and are described more fully in the literature such as *Modern Plastics Encyclopedia,* Volume 55, No. 10A, pages 110–114.

The polyesters which can be included in the resin systems of the invention may be saturated or unsaturated polyesters. Saturated polyesters generally are prepared of reacting (i) a glycol such as ethylene-, propylene-, diethylene-, dipropylene-, or butylene glycol, with (ii) an acid or anhydride such as adipic acid, azelaic acid, terephthalic acid and phthalic anhydride. The unsaturated polyesters are characterized by vinyl unsaturation in the polyester backbone which permits subsequent hardening or curing of copolymerization with a reactive monomer. These are prepared by reacting unsaturated dibasic acids or anhydrides (e.g., fumeric acid or maleic anhydride) with glycols or a mixture of glycols such as propylene or diethylene glycol. The unsaturated polyesters are thermosetting and widely used in reinforced plastics. Examples of a commercially available polyester which can be utilized in the invention are the polyesters available from the General Electric Company under the general trade designation "Valox" and from Eastman under the general trade designations "Tenite", "Kodar" and "Ektar".

Polyamides which can be utilized include those obtained by the condensation of diamines and polycarboxylic acids such as condensation polymers of trimellitic anhydride and various aromatic diamines; hexamethylene-diamine with adipic acid, etc. Polyamides are available commercially from Amoco Chemicals Corp. under the tradename "Torlon".

Phenylene oxide-based resins also can be utilized in the preparation of the properties of phenylene oxide-based resins are described in the *Modern Plastics Encyclopedia,* Volume 55, No. 10A at pages 36–38. These types of resins can be obtained commercially from the General Electric Company under the general trade designation "Noryl".

ABS resins acrylonitrile-butadiene-styrene terpolymers also can be included in the plasticized resin systems of the invention. Styrene-acrylonitrile resins (SAN) can be included in the plasticized resin systems of the invention. The ABS and SAN resins are described also in the *Modern Plastics Encyclopedia,* Volume 55, No. 10A at pages 4 and 108 respectively.

A variety of nitrile polymers and copolymers can be included in the plasticized resin systems of the invention, and one type of such nitrile polymers is described in detail in U.S. Pat. Nos. 4,041,005 and 4,151,151, the specifications of which are hereby incorporated by reference. High nitrile copolymers of the types described in these patents are available commercially. One group of nitrile copolymers comprises acrylonitrile, methylacrylate and an acrylonitrile-butadiene rubber. Nitrile polymers of this type are available under the general trade designation "Barex" from Vistron Corporation, a subsidiary of The Standard Oil Company of Ohio, Cleveland, Ohio.

When one or more of the polar resins of the types described above are to be included in the plasticized resin systems of the invention, such polar resins are dispersed into the interpolymer described above either before, after or simultaneously with the addition of the hydroxy substituted fatty acid. The sequence generally is not critical although a particular order of addition may be found to be desirable depending upon the particular resin combination selected.

Other ingredients may be dispersed into the resin systems of the invention to obtain special effects and these include one or more of the following: fillers, fibrous reinforcing materials, pigments, and mold release agents.

Fillers are added to the resin mixture as extenders and to impart such properties as reduction in shrinkage and tendency to crack during curing. Fillers also tend to improve stiffness and heat resistance in molded articles. Examples of fillers that can be utilized in the resins of the invention include alumina trihydrate, calcium carbonate, clays, wood flour, calcium silicate, silica, talcs, mica, barytes, dolomite, solid or hollow glass spheres of various densities.

The particular filler chosen may be dependent upon the cost of such filler, the effect of the filler on mix viscosity and flow properties during extrusion, or the effect that the filler has on properties such as shrinkage, surface smoothness, chemical resistance, flammability and/or the electrical characteristics of the cured molded article. The amounts of filler included in the resin formulations may vary up to about 70% by weight, and the amount preferred for any particular formulation can be determined readily by one skilled in the art. Useful fillers generally will have an average particle size of from about 1 to about 50 microns.

Fibrous reinforcing materials can be added to the resin compositions of the invention for the purpose of imparting strength and other desirable physical properties to the cured products formed therefrom. Examples of fibrous reinforcements that can be utilized include glass fibers, asbestos, synthetic organic fibers such as acrylonitrile, nylon, polyamide, polyvinyl alcohol and polyester fibers, and natural organic fibers such as cotton and sisal. The preferred fibrous reinforcements generally will be glass fibers which are available in a variety of forms including, for example, mats of chopped or continuous strands of glass, glass fabrics, chopped glass and chopped glass strands.

The amount of fibrous reinforcing material included in the compositions of the invention can be varied over a wide range including amounts of up to about 75% although much smaller amounts will be required if any of the above described fillers are included in the formulation. The amount of fibrous reinforcing material to be utilized in any particular formulation can be determined readily by one skilled in the art and generally will not be over 40% by weight based on the weight of the resin.

Mold release agents also can be included in the formulations of the invention, and these are typically zinc, calcium, magnesium amd lithium salts of fatty acids. Specific examples of mold release agents include zinc stearate, calcium stearate, magnesium stearate, lithium stearate, calcium oleate, zinc palmitate, etc. Amounts of up to about 5% of the mold release agent, and preferably from about 1 to about 5% of the mold release agent can be included in the mixture based upon the weight of the polyester and monomer.

Pigments also can be included in the formulations of the invention. Typical examples of pigments include carbon blacks, iron oxides, titanium dioxide and phthalocyanines. The pigment can be dispersed into the mixtures as dry pigment powders or pre-dispersed forms in non-reactive carriers.

The plasticized resin systems of the invention are characterized by high rigidity and improved heat resistance. The addition of glass fibrous reinforcement to the resin systems of the invention results in an increase in tensile and flexural strength, improved heat resistance under load, raises Izod impact strength and decreases mold shrinkage and coefficient of linear expansion.

The properties of the plasticized resin system can be measured using standard ASTM test procedures. Heat distortion temperature is determined by ASTM procedure D-64A. ASTM test D-790 is used to measure flexural strength and flexural modulus. The tensile strength is measured according to ASTM D-638, and the notched Izod impact strength by ASTM D-256. A torque test also can be conducted on the plasticized resin systems of the invention to indicate the viscosity of a melt. It is desirable in resin systems of the type described in the present application to have low viscosity since this permits increased extruder output, and the increased output can be obtained with less degradation of the resin. This test is conducted by blending the resin system in a Brabender plasticorder (50 gram sample) at 35 rpm and at 240° C. for a given period of time, e.g., up to 7 minutes. At the end of this time, the torque is recorded.

The following examples illustrate the plasticized resin compositions of the invention. Unless otherwise indicated, all parts and percentages are by weight.

EXAMPLE 1

A 2-liter, stirred reactor, charged with 0.1 part Azobisisobutyronitrile (Vazo 64) initiator, 48.5 parts maleic anhydride and 250 parts methyl ethyl ketone, is heated rapidly to 75° C. under a nitrogen atmosphere. At this point, a solution composed of 0.1 part Vazo 64, 51.5 parts of styrene, and 50 parts of methyl ethyl ketone is metered into the reactor is 97 minutes, while maintaining the stirring and a temperature range of 75°–82° C. The stirring and heating are continued for an additional 30 minutes, then the reactor is allowed to cool down.

The polymer is isolated by pouring into cold methanol. After filtering and vacuum drying, the polymer weight constitutes 96% of the theoretical yield.

Fifty grams of this styrene/maleic anhydride copolymer containing 51.5% of styrene and 48.5% maleic anhydride is blended with three grams of 12-hydroxy stearic acid in a Brabender plasticorder at 240° C. and 35 rpm, and after 7 minutes, a torque reading of 2800 meter-grams is obtained. The improvement obtained by the present invention is demonstrated by repeating the above procedure in the absence of 12-hydroxy stearic acid. A torque reading of 3600 meter-grams is obtained.

EXAMPLE 2

Fifty grams of a styrene/maleic anhydride copolymer comprised of 85 parts of styrene and 15 parts of maleic anhydride (available commercially from ARCO Polymers Inc. under the designation "Dylark 332") are blended with two grams of 12-hydroxy stearic acid in a Brabender plasticorder at 240° C. and 35 rpm, and at the end of 7 minutes, a torque reading of 360 meter-gram is obtained. In comparison, when the procedure is repeated except that the 12-hydroxy stearic acid is omitted, a torque reading of 650 meter-grams is obtained.

EXAMPLE 3

The procedure of Example 2 is repeated except that the mixture of Dylark 332 and 12-hydroxystearic acid is blended in the plasticorder for one minute. At the end of one minute, a torque reading of 530 meter-gram is obtained. In comparison, a torque reading of 1150 meter-gram is obtained when the 12-hydroxy stearic acid is omitted.

EXAMPLE 4

A mixture of 15 grams of Dylark 332 and 35 grams of a polycarbonate resin available from Aldrich Chemical Co., (No. 18, 163-5) is blended in a Brabender plasticorder with one gram of 12-hydroxy stearic acid at 240° C. and 35 rpm. A torque reading of 910 meter-gram is obtained after one minute and a reading of 310 meter-gram is obtained after 7 minutes. In comparison, when the 12-hydroxy stearic acid is omitted from the blend, a reading of 1800 meter-grams is obtained after one minute and a reading of 700 meter-grams after 7 minutes.

EXAMPLE 5

A mixture of 15 grams of Dylark 322 and 35 grams of a polybutylene terephthalate polyester resin available from General Electric under the designation "Valox 310" is blended in a Brabender plasticorder at 240° C. and 35 rpm with one gram of 12-hydroxy stearic acid. After one minute, a torque reading of 910 meter-grams is obtained, and after 7 minutes, a reading of 310 meter-grams is obtained. In comparison, when the hydroxy stearic acid is omitted from the mixture, a torque reading of 1400 meter-grams is obtained after one minute, and after 7 minutes, a reading of 500 meter-grams is obtained.

EXAMPLE 6

The procedure of Example 5 is repeated except that the Valox 310 is replaced by an equal amount of a nitrile resin available from Vistron Corporation under the trade designation "Barex 210".

EXAMPLE 7

A plasticized resin system is prepared comprising 35 grams of Dylark 332 and two grams of 12-hydroxy stearic acid in which there is incorporated 15 grams of one-quarter inch glass fibers (available from Pittsburgh Plate Glass on "PPG 3535". The mixture is blended in a Brabender plasticorder for a period of about 7 minutes at 240° C. and at 35 rpm. The properties of the product obtained in this manner are summarized in the following table. The table also contains corresponding data for a mixture of Dylark 332 and glass fibers without the plasticizer

| Sample | Torque (meter-gms) | Flexural Strength ($\times 10^3$ psi) | Flexural Modulus ($\times 10^5$ psi) | Tensile Strength ($\times 10^3$ psi) |
|---|---|---|---|---|
| Example 7 | 330 | 10 | 9.4 | 7.26 |
| Control (no plasticizer) | 570 | 6.07 | 7.87 | 2.12 |

EXAMPLE 8

The procedure of Example 4 is repeated except that the polycarbonate is replaced by an equivalent amount of a polyphenylene oxide resin available from General Electric under the trade designation "Noryl".

EXAMPLE 9

The procedure of Example 4 is repeated except that the polycarbonate is replaced by an equivalent amount of a polysulfone resin available from Union Carbide Corp. under the trade designation "UDEL".

The plasticized resin systems obtained in accordance with the present invention generally exhibit improved flexibility, workability and distensibility. When reinforced with glass fibers the resin system exhibit increased tensile and flexural strengths, improved heat resistance under load, higher Izod impact strength and decreased shrinkage and coefficient of linear expansion. The plasticized resin systems produced in accordance with the invention are useful thermoplastic materials which can be molded into a variety of shapes and structures including containers, pipes, rods, films, sheets, fibers, etc.

I claim:

1. A plasticized resin system comprising an intimate mixture of
   (a) an interpolymer derived from (i) at least one vinyl monomer and (ii) an α,β-unsaturated dicarboxylic acid anhydride or the lower alkyl esters thereof, and
   (b) a plasticizing amount of a hydroxy substituted fatty acid containing at least about 8 carbon atoms.
2. The resin system of claim 1 wherein (ii) is maleic acid, fumaric acid, the lower alkyl esters of these acids or maleic anhydride.
3. The plasticized resin system of claim 1 wherein the interpolymer of (a) comprises from about 40 to 90 molar parts of at least one vinyl monomer (i) and about 10 to 60 molar parts of (ii).
4. The plasticized resin system of claim 1 wherein the vinyl monomer (i) is represented by the formula

 (I)

wherein
A is a hydrogen or an alkyl group containing from 1 to about 4 carbon atoms,
B is hydrogen or an alkyl, alkenyl, alkoxy, acyl, phenyl, substituted phenyl, nitrile, carboxyl, carboxylic ester, carboxylic amide group, or
A, B and C' taken together form a cyclic or bicyclic group.
5. The plasticized resin system of claim 1 wherein the hydroxy substituted fatty acid contains from about 8 to 22 carbon atoms.
6. The plasticized resin system of claim 1 wherein the vinyl monomer is a styrene.
7. The plasticized resin system of claim 1 containing up to about 20 parts of the hydroxy substituted fatty acid per 100 parts of resin.
8. The plasticized resin system of claim 5 wherein the hydroxy substituted fatty acid is 12-hydroxy stearic acid.
9. The plasticized resin system of any one of claims 1-8 wherein the system also contains (C) at least one additional polar resin.
10. The plasticized resin system of claim 9 wherein the additional polar resin is a polycarbonate, polysulfone, polyester, polyamide, polyphenylene oxide, ABS, SAN or nitrile polymer.
11. The plasticized resin system of claim 9 wherein up to about 400 parts of the additional polar resin are included in the resin system per 100 parts of the interpolymer of (a).
12. The plasticized resin system of claim 9 wherein the resin system also contains up to about 40% by weight of glass fibers.
13. A plasticized resin system comprising an intimate mixture of
   (a) a interpolymer of a styrene and maleic anhydride,
   (b) from 0 to 400 parts, per 100 parts of (a), of at least one additional polar resin selected from the group consisting of polyesters, polycarbonates and polysulfones, and
   (c) a plasticizing amount of a hydroxy substituted fatty acid containing at least 8 carbon atoms.
14. The plasticized resin system of claim 13 wherein the fatty acid contains from about 8 to about 22 carbon atoms.

15. The plasticized resin system of claim 13 wherein from about 1 to 20 parts of the hydroxy substituted fatty acid is included per 100 parts of resin.

16. The plasticized resin system of claim 13 wherein the interpolymer of (a) comprises from 40 to 90 parts of styrene and about 10 to 60 parts of maleic anhydride.

17. The plasticized resin system of claim 13 wherein the polar resin is a polysulfone.

18. The plasticized resin system of claim 13 wherein the polar resin is a polycarbonate.

19. The plasticized resin system of claim 13 wherein the polar resin is a polyester.

20. The plasticized resin system of claim 13 wherein the hydroxy substituted fatty acid is 12-hydroxy stearic acid.

21. The plasticized resin system of claim 13 wherein the resin also contains up to about 40% of glass fibers.

* * * * *